(12) United States Patent
Bharati (10) Patent No.: US 11,138,856 B1
(45) Date of Patent: Oct. 5, 2021

(54) INTELLIGENT INFANT SLEEP POSITION MONITOR TO AVOID SIDS

(71) Applicant: Vivek Satya Bharati, Los Altos, CA (US)

(72) Inventor: Vivek Satya Bharati, Los Altos, CA (US)

( * ) Notice: Subject to any disclaimer, the term of this patent is extended or adjusted under 35 U.S.C. 154(b) by 0 days.

(21) Appl. No.: 17/000,274

(22) Filed: Aug. 22, 2020

(51) Int. Cl.
| | |
|---|---|
| *G08B 21/02* | (2006.01) |
| *G06K 9/00* | (2006.01) |
| *G06T 7/70* | (2017.01) |
| *G06K 9/62* | (2006.01) |
| *H04N 7/18* | (2006.01) |
| *G06N 3/08* | (2006.01) |
| *H04W 4/14* | (2009.01) |

(52) U.S. Cl.
CPC ..... *G08B 21/0222* (2013.01); *G06K 9/00268* (2013.01); *G06K 9/00369* (2013.01); *G06K 9/6263* (2013.01); *G06N 3/08* (2013.01); *G06T 7/70* (2017.01); *G08B 21/0208* (2013.01); *H04N 7/183* (2013.01); *H04W 4/14* (2013.01); *G06T 2207/20081* (2013.01); *G06T 2207/20084* (2013.01); *G06T 2207/30201* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 10,921,763 B1* | 2/2021 | Correnti | G05D 1/0011 |
| 2021/0090238 A1* | 3/2021 | Gallagher-Gruber | G01N 15/0625 |
| 2021/0133518 A1* | 5/2021 | Yao | G06K 9/6857 |

* cited by examiner

*Primary Examiner* — Dakshesh D Parikh (57) ABSTRACT

The invention relates to a system and method for detecting high risk sleeping position of an infant relating to Sudden Infant Death Syndrome (SIDS). The invention utilizes a deep learning model for detecting sleeping position of the infant, alerting the caregiver and further refining the deep leaning model based on the caregiver's feedback for future infant sleeping positions. The system retrains the deep learning model based on the captured feedback from the caregiver to reduce false negatives and permit false positives. The invention thereby proposes a new non-intrusive but failsafe mechanism to monitor the babies in the crib and uses commonly available hardware to achieve the same. The system can leverage multiple channels of communication to ensure that latency in any channel do not defeat the purpose of the system.

6 Claims, 5 Drawing Sheets

INTELLIGENT INFANT SLEEP POSITION MONITOR TO AVOID SIDS

TECHNICAL FIELD

The present subject matter described herein, in general relates to a system and method for detecting high risk sleeping position of an infant relating to Sudden Infant Death Syndrome (SIDS). In particular, the present subject matter relates to a deep learning model for detecting sleeping position of the infant, alerting the caregiver and further refining the deep learning model based on the caregiver's feedback for future infant sleeping positions.

BACKGROUND

Sudden infant death syndrome (SIDS) is a sudden and unexpected death of an apparently healthy infant whose death remains unexplained after further medical investigation. SIDS is not acknowledged as a disease, nor has it been diagnosed for a living baby. However, many SIDS deaths have been documented where an infant has been sleeping face down. A face down infant is considered by many experts in the field of infant mortality to be a high risk position for a SIDS attributed death because a face down position may lead to periods of apnea (stoppage of breathing). While infants may be resuscitated during a period of apnea, most SIDS events occur at night when the infant's caregiver is sleeping.

Sudden Infant Death Syndrome (SIDS) causes babies to die without warning. One of the most important external factors responsible for SIDS called an "outside stressor", is the sleeping position of the baby. When the baby sleeps on the stomach, the risk of SIDS occurring is extremely high. Attempts have been made to identify a SIDS event and provide a technological solution to early detection. However, such detection merely identifies that an infant has stopped breathing, which is too late to prevent the SIDS event from occurring.

Therefore, it would be desirable to provide a non-intrusive SIDS detection system capable of detecting high risk sleeping position of an infant and alerting the concerned caregiver on detection of any such event.

SUMMARY

This summary is provided to introduce concepts related to a system and method for detecting high risk sleeping position s of an infant relating to Sudden Infant Death Syndrome (SIDS). This summary is not intended to identify essential features of the claimed subject matter or determining/limiting the scope of the claimed subject matter.

In one embodiment, a system for monitoring a baby sleeping position by using a child monitor camera positioned on a crib is disclosed. The system comprises of a processor and a memory that is coupled to the processor. The processor is configured to execute programmed instructions stored in the memory for performing the task of alerting a caregiver on detecting the high risk sleeping position of the infant in the crib. The processor initially may receive plurality of images of the baby from the child monitor camera positioned on the crib. The processor may then store the received plurality of images. The processor may further be configured to process the stored plurality image using machine learning methods that classify regions of interest within the images, recognize objects, and sleeping positions of the baby from the images. The processor may then use machine learning model (i.e. Convoluted Neural Network—CNN) of the system to analyze the plurality of images and consequently detect a plurality of sleeping positions the baby is in based on the analysis of the plurality of images. The processor may further be configured to electronically communicate to a mobile device of a caregiver, information regarding the plurality of sleeping positions the baby is in based on the analysis of the plurality of images. The electronic communication may involve steps of: generating multiple alerts on multiple channels such as SMS alert, mobile app notification, capturing a feedback on the generated alerts from the caregiver, and then retraining the CNN based on the captured feedback to reduce false negatives and permit false positives.

In another embodiment, a method to monitor a baby sleeping position using a child monitor camera positioned on a crib is disclosed. The method may comprise receiving, via a processor, a plurality of images of the baby from the child monitor camera. Further, the method may comprise storing, via the processor, the received plurality of images and process, the stored plurality images by using machine learning methods that classify regions of interest within the images, recognize objects, and sleeping positions of the baby from the images. The method may further comprise analyzing, via the processor, the plurality of images and consequently detect a plurality of sleeping positions the baby is in based on the analysis of the plurality of images. The method may further comprise electronically communicating, via the processor, to a mobile device of a caregiver, information regarding the plurality of sleeping positions the baby is in based on the analysis of the plurality of images. The method of electronically communicating to the mobile device of the caregiver may further comprises steps of: generating multiple alerts on multiple channels such as SMS alert, mobile app notification, capturing a feedback on the generated alerts from the caregiver, and retraining the CNN based on the captured feedback to reduce false negatives and permit false positives.

In yet another embodiment, a non-transitory computer-readable storage medium, having computer executable instructions stored thereon to monitor a baby sleeping position using a child monitor camera positioned on a crib is disclosed. The computer executable instructions, when executed by the at least one processor, cause the at least one processor to receive a plurality of images of the baby from the child monitor camera. Further, the computer executable instructions, when executed by the at least one processor, cause the at least one processor to store the received plurality of images. The computer executable instructions, when executed by the at least one processor, further cause the at least one processor to process the stored plurality image using machine learning methods that classify regions of interest within the images, recognize objects, and sleeping positions of the baby from the images. Further, the computer executable instructions, when executed by the at least one processor, cause the at least one processor to analyze the plurality of images and detect a plurality of sleeping positions the baby is in based on the analysis of the plurality of images. Furthermore, the computer executable instructions, when executed by the at least one processor, cause the at least one processor to electronically communicate wirelessly to a mobile device of a caregiver, information regarding the plurality of sleeping positions the baby is in based on the analysis of the plurality of images, wherein electronically communicating wirelessly to the mobile device of the caregiver further comprises steps to: generate multiple alerts on multiple channels such as SMS alert, mobile app notification; capture a feedback on the generated alerts from the caregiver; and retrain the CNN based on the captured feedback to reduce false negatives and permit false positives.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

The goal of the system is to provide an effective, reliable, non-intrusive and low-cost solution that can detect a baby shifting from a "sleeping on back" to "sleeping on stomach" position and alert the caregiver within 3 seconds of the occurrence of the shifting.

The system consists of a camera, connected to a computer that has network connectivity. The camera is used to take pictures of the baby, and each photo of the baby is thereby passed to the connected computer, for processing. The computer uses a deep learning model, to understand baby's position within the photo. This includes whether the baby is "Sleeping on its back", "Starting to turn" or "turned to sleep on front". If the baby is starting to turn, the system can intimate the caregiver, with an alert on a mobile phone, consisting of the captured image.

Once an alert is received by the caregiver and they determine the same to be a false alarm, they could mark the same and system may use this knowledge to retrain or refine the deep learning model. This way the system gets quickly adopted to be more accurate for any specific baby as the feedback from the caregiver is used by the system to retrain the deep learning model used for detecting the sleeping position or position of the baby.

Figure 1:
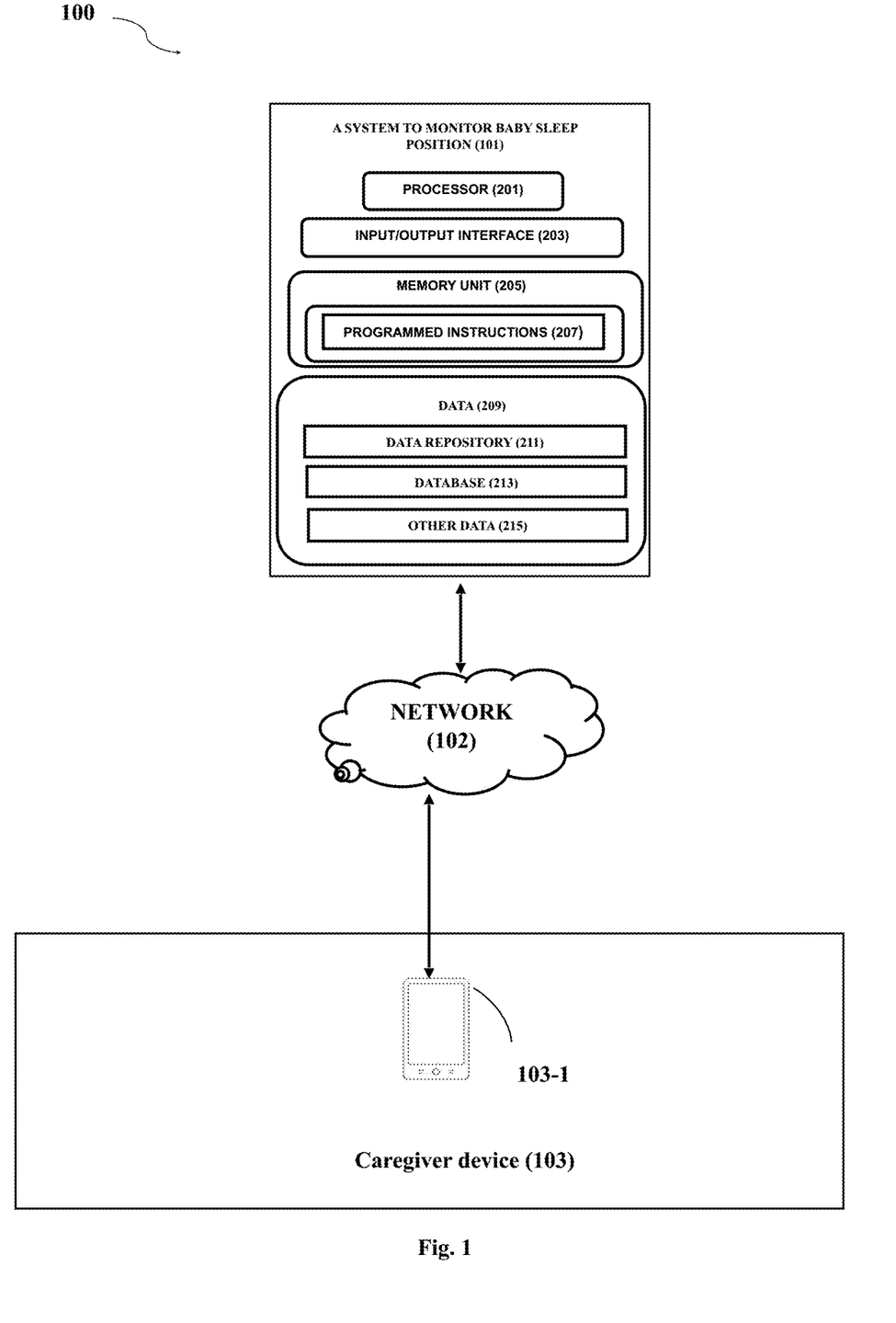
FIG. 1 illustrates, a network implementation (100) of a system (101) for detecting high risk sleeping position of the baby in a crib is illustrated, in accordance with an embodiment of the present subject matter.

Referring to FIG. 1, a network implementation (100) of a system (101) for detecting high risk sleeping position of the baby in a crib is illustrated, in accordance with an embodiment of the present subject matter.

In an embodiment, the system (101) for detecting high risk sleeping position of the baby in a crib (hereinafter referred as system (101) interchangeably) may be connected to a caregiver device (103) over a network (102). It may be understood that the system (101) for detecting high risk sleeping position of the baby (101) may be accessed by multiple users through one or more user devices, collectively referred to as a caregiver device (103). The caregiver device (103) may be any electronic device, communication device, image capturing device, machine, software, automated computer program, a robot or a combination thereof.

In one embodiment, system (101) may be implemented in a cloud-computing environment. In an embodiment, the network (102) may be a wireless network such as Bluetooth, Wi-Fi, 3G, 4G/LTE and alike, a wired network or a combination thereof. The network (102) can be accessed by the caregiver device (103) using wired or wireless network connectivity means including updated communications technology.

In one embodiment, the network (102) can be implemented as one of the different types of networks, cellular communication network, local area network (LAN), wide area network (WAN), the internet, and the like. The network (102) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network (102) may include a variety of network devices, including routers, bridges, servers, computing devices, storage devices, and the like.

Further, referring to FIG. 1, various components of the system (101) for detecting high risk sleeping position of the baby in a crib, in accordance with an embodiment of the present subject matter are disclosed. As shown, the system (101) may include at least one processor (201), an input/output interface (203), a memory (205), programmed instructions (207) and data (209). In one embodiment, the at least one processor (201) is configured to fetch and execute computer-readable instructions stored in the memory (205).

In one embodiment, the I/O interface (203) implemented as a mobile application or a web-based application and may further include a variety of software and hardware interfaces, for example, a web interface, a graphical user interface, and the like. The I/O interface (203) may allow the system (101) to interact with the user devices (103). Further, the I/O interface (203) may enable the user device (103) to communicate with other computing devices, such as web servers and external data servers (not shown). The I/O interface (203) can facilitate multiple communications within a wide variety of networks and protocol types, including wired networks, for example, LAN, cable, etc., and wireless networks, such as WLAN, cellular, or satellite.

The I/O interface (203) may include one or more ports for connecting to another server. In an exemplary embodiment, the I/O interface (203) is an interaction platform which may provide a connection between users and system (101).

In an implementation, the memory (205) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory (205) may include modules (207) and data (209).

In one embodiment, the programmed instructions (207) may include, routines, programs, objects, components, data structures, etc. which perform particular tasks, functions, or implement particular abstract data types. The data (209) may comprise a data repository (211), database (213) and other data (215). In one embodiment, the database (213) may comprise customizable image segments data pre-trained and customized objects data and segmentation data associated with a plurality of images. The other data (215) amongst other things, serves as a repository for storing data processed, received, and generated by one or more components and programmed instructions.

Figure 2:
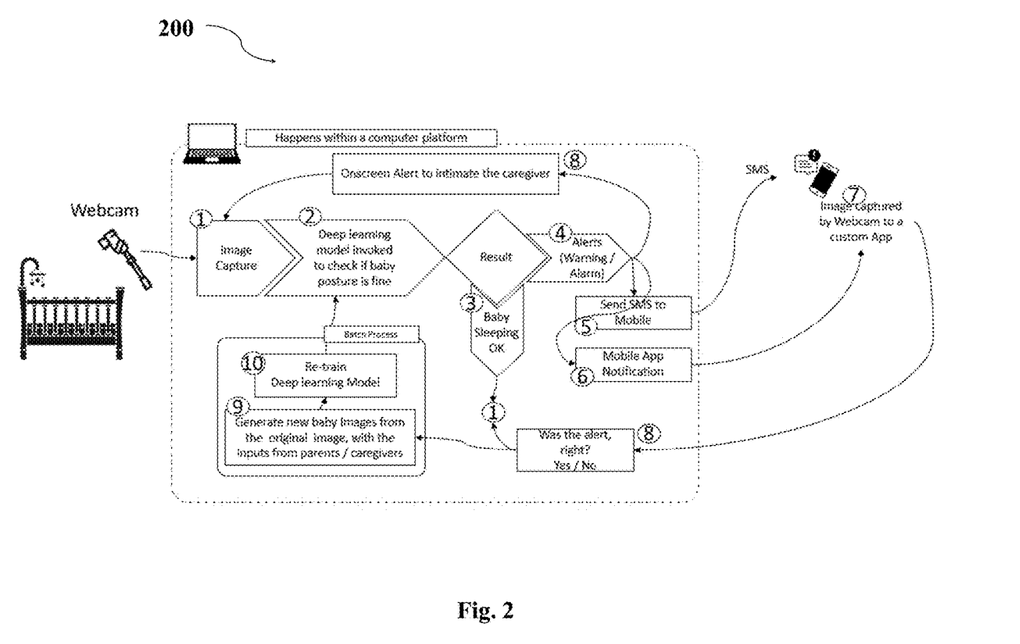
FIG. 2 illustrates a procedural & stepwise flow (200) followed to detect the high risk sleeping position of the baby in a crib, in accordance with an embodiment of the present disclosure.

Referring now to FIG. 2, the components of the invention are disclosed, wherein the steps involved in the functioning of these different components are elaborated.

In one embodiment, a camera (i.e. webcam) is positioned on the crib, facing the baby. The camera is connected to a computer and the program running on the computer takes an image of the baby. Further, the captured image is used by a deep learning model for detecting the baby sleep position, wherein the deep learning model is trained with many thousand baby images. Here, the deep learning model leveraged is based on Convolutional Neural Networks (i.e. CNN)

In another embodiment, the different layers of the deep neural network are grouped and categorized broadly to carry out the following functionalities:

Converting the captured image into grey scale (so that effects of lighting/visual differences of night vision are not considered. This also enables usage of night vision cameras) and subtracting the background of bedsheet (so that when the baby sleeps in a crib with different bed sheets, the design on the bedsheets do not interfere, with the features of baby's visual features of sleep posture)

A convolutional auto encoder is used for this. The layers of convolutional auto encoder are trained using back propagation method with input images and the corresponding output images. To create the training data, the image of the crib is captured without the baby and with the baby. An image processing program (OpenCV) is used to subtract the crib details from the one with the baby and saved as greyscale. To create many images, separate frames are extracted out from video recordings of the crib with/without the baby.

In another embodiment, the layers of the trained convolutional auto encoder can take a color image captured by the webcam and generate a similar resolution grey scale image with only the baby.

Recognizing the visual differences in the facial features of baby based on different sleeping postures and attributing them if the baby is trying to turn, or fully turned.

The neural network consists of, multiple of convolution layers followed by a max pooling layer. This enables extracting of features specific to baby posture. The convolution layers leverage Rectified Linear Unit (ReLU) as the activation function. At the end of each epoch, or full iteration, the network is manipulated using the Dropout function. This randomly shuts down nodes in the neural network to prevent redundancy in the outputs of each layer (which can cause overfitting and false levels of accuracy).

The model is initially trained with a baby sleeping in a crib. The prediction of the model has three values:
 Sleeping on Back—OK>(Confidence score of x %)
 Baby trying to turn—Warning>(Confidence score of y %)
 Baby turned over and lying on front Alarm>(Confidence score of z %)

When the system is new, x<50% or y>50% or z>50% would raise an alert (Warning or Alarm based on higher score between y or z) to the caregiver. This ensures that the system does not miss any event of the baby turning over. If the caregiver says, "Ok & Clear", that reinforces the prediction, and the image is used for future training, by tagging it to the correct class (Baby Trying to Turn—Warning or Baby turned over and lying on the front—Alarm). This adds one data point.

Now, if the caregiver clicks Wrong Alert, the image again is used for future training, but this time, the image would be tagged to Ok (Sleeping on Back—OK). These captured real images are used to retrain the model alongside the original images used for training. Over time, these numbers of images would exceed the initial trained images and the system would be more accurate in its prediction.

In another embodiment, the system automatically tests x<40% or y>60% or Z>60%, and if this holds good alongside 50% check, then the system suggests the caregiver to permanently set the accuracy levels to the suggestion. This lowers the false alarms, and incrementally improves the confidence of the caregiver in the system. This exercise over time can help in incrementally improving the accuracy of the system and giving confidence to the caregiver that the monitoring system is accurate.

The main intention of the above steps is to ensure that false negatives are kept at zero (e.g.: baby turned, but the system didn't recognize), while false positives are still ok (e.g.: baby might have moved its hand, but system suspected that he/she is trying to turn over and generated an Alert).

In another embodiment, the alerts are vetted by the caregiver, so that the system becomes more fine turned for the specific baby. Caregiver is also given options to move this confidence levels, so that they can optimize the level at which they wish to receive alerts. For example, if the baby has other complications, the caregiver can set the systems to levels where any small suspicions would also generate alerts. Also, as more data accumulates over time and with caregiver's feedback the thresholds are moved up (this takes confirmations from caregivers), so that the system will not generate more false positives.

In another embodiment, for a specific image captured, if the system decides the baby is OK, the system captures next image and continues to further steps. This establishes a continuous monitoring system.

In yet another embodiment, in situations when the system decides to intimate the caregivers, an onscreen visible indicator may be turned on. Also, the system generates multiple alerts on multiple channels such as, an SMS alert is sent to the caregiver, and an 'App Notification' is generated with the picture from the camera. Further, the system can generate multiple alerts (e.g.: SMS to 3 phones) on multiple channels (e.g.: An App Notification on multiple mobile devices), generate voice messages on home automation devices (e.g.: Amazon Echo).

In yet another embodiment, the invention can also communicate on a home local area network (LAN). This is made possible by directly connecting the App to the computer processing the image via the home LAN (established when connecting all home devices into the home WiFi), wherein mobile is connected to the same network, as that of the computer capturing the camera images. The intent is to ensure that a channel failure or latency do not hinder the performance of the system and fail to alert the caregiver.

The human in loop approach is put in place to ensure that, only a better model is promoted to production. Once in production, the older model is archived, the any new one becomes the primary to evaluate the next models built.

Figure 3A:
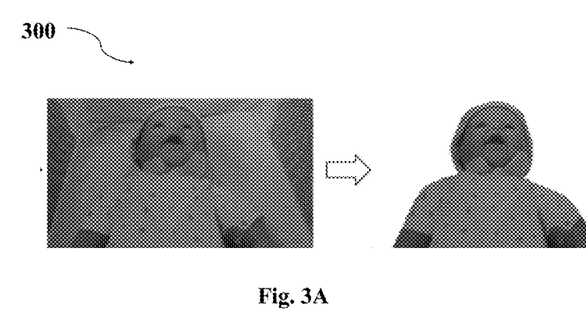
FIG. 3A illustrates the output (300) of the camera captured image on applying deep learning model (CNN), in accordance with an embodiment of the present disclosure.
Figure 3B:
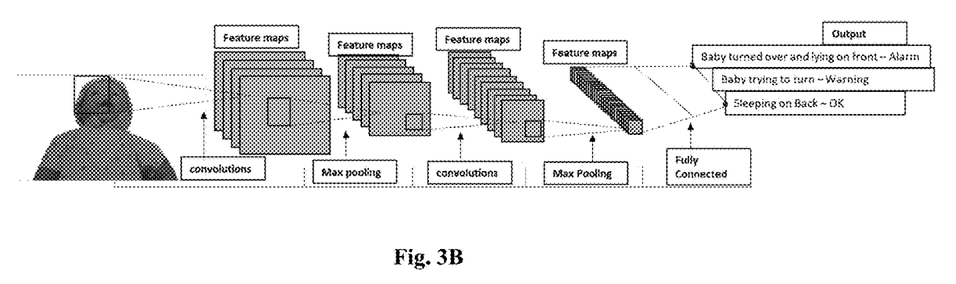
FIG. 3B illustrates the neural network (300) consisting of multiple of convolution layers followed by a max pooling layer, in accordance with the embodiment of the present disclosure.

Referring to FIGS. 3A & 3B, FIG. 3A illustrates the output (300) of the camera captured image on applying deep learning model (CNN), in accordance with an embodiment of the present disclosure. Further, FIG. 3B illustrates the neural network (300) consisting of multiple of convolution layers followed by a max pooling layer, in accordance with the embodiment of the present disclosure. The disclosed convolutional layers & max pooling layers generate the output in three categories, wherein each category has customized alerts associated with it that permits false positives and reduces false negatives.

Figure 4:
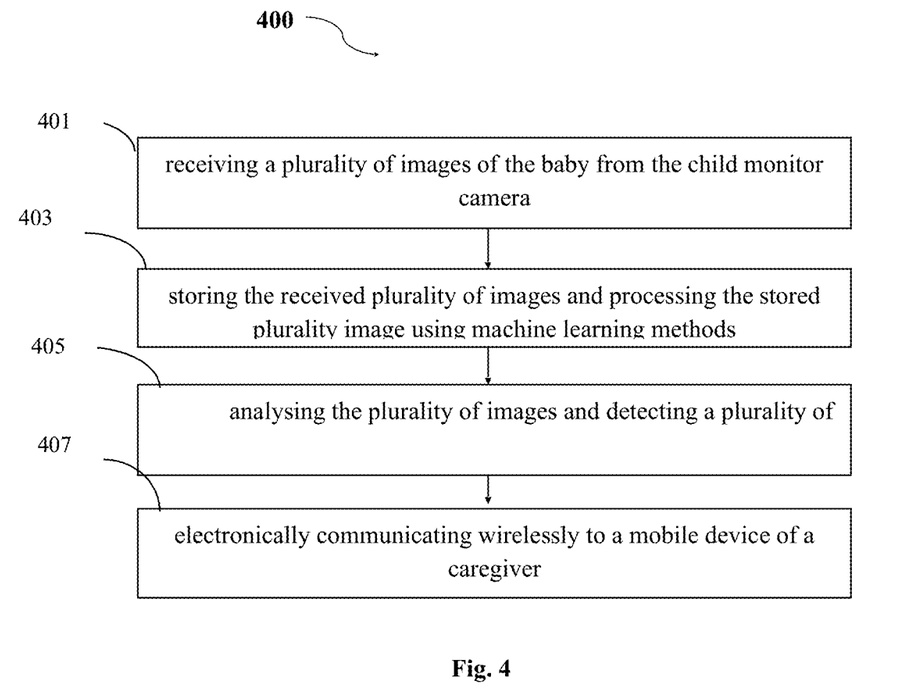
FIG. 4 illustrates a method (400) for detecting high risk sleeping position of the baby in a crib, in accordance with an embodiment of the present disclosure.

Now, referring to FIG. 4, a method (400) to monitor a baby sleeping position using a child monitor camera positioned on a crib is illustrated in accordance with the embodiments of the present disclosure. The order in which method (400) is described is not intended to be construed as a limitation, and any number of the described method blocks can be combined in any order to implement the method (400) or alternate methods. Furthermore, the method (400) can be implemented in any suitable hardware, software, firmware, or combination thereof. However, for the ease of explanation, in the embodiments described below, the method (400) may be implemented in the above described system (101).

At step (401), the processor (201) may be configured to receive a plurality of images of the baby from the child monitor camera.

At step (403), the processor (201) may be configured to store the received plurality of images and process, the stored plurality images by using machine learning methods that classify regions of interest within the images, recognize objects, and sleeping positions of the baby from the images.

At step (405), the processor (201) may be configured to analyze the plurality of images and consequently detect a plurality of sleeping positions the baby is in based on the analysis of the plurality of images.

At step (407), the processor (201) may be configured to electronically communicate to a mobile device of a caregiver, information regarding the plurality of sleeping positions the baby is in based on the analysis of the plurality of images. In another embodiment, electronically communicating to the mobile device of the caregiver may further comprises steps of: generating multiple alerts on multiple channels such as SMS alert, mobile app notification, capturing a feedback on the generated alerts from the caregiver, and retraining the CNN based on the captured feedback to reduce false negatives and permit false positives.

Figure 5:
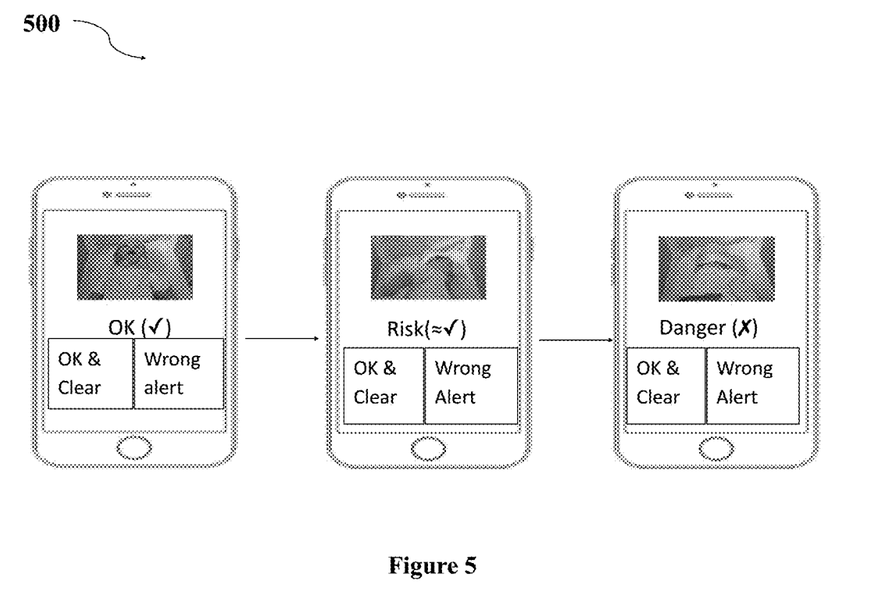
FIG. 5 illustrates a mobile app (500) that displays the image captured (of the baby by the camera) on the 'Baby Monitor Application' and allows the caregivers to remotely annul the alert state, in accordance with an embodiment of the present disclosure.

Now referring to FIG. 5, FIG. 5 illustrates a mobile app that displays the image captured (of the baby by the camera) on the 'Baby Monitor Application' and allows the caregivers to remotely annul the alert state, in accordance with an embodiment of the present disclosure. The caregiver can provide the feedback on the generated alert, which is used by the deep learning model to retrain itself for future situations.

The embodiments, examples and alternatives of the preceding paragraphs or the description and drawings, including any of their various aspects or respective individual features, may be taken independently or in any combination. Features described in connection with one embodiment are applicable to all embodiments unless such features are incompatible.

Although implementations for monitoring a baby sleeping position using a child monitor camera positioned on a crib and the method thereof have been described in language specific to structural features and/or methods, it is to be understood that the approached claims are not necessarily limited to the specific features or methods described. Rather, the specific features and method are disclosed as examples of implementations for alerting a caregiver to prevent SIDS in situations when the infant is under high risk sleeping position in the crib.

What is claimed is:

1. A system for monitoring a baby sleeping position using a child monitor camera positioned on a crib, the system comprising:
   a processor; and
   a memory coupled to the processor, wherein the processor is configured to execute programmed instructions stored in the memory for:
      receiving a plurality of images of the baby from the child monitor camera; storing the received plurality of images;
      processing the stored plurality image using machine learning methods that classify regions of interest within the images, recognize objects, and sleeping positions of the baby from the images;
      analyzing, the plurality of images;
      detecting, a plurality of sleeping positions the baby is in based on the analysis of the plurality of images; and
      electronically communicating wirelessly to a mobile device of a caregiver, information regarding the plurality of sleeping positions the baby is in based on the analysis of the plurality of images, wherein electronically communicating wirelessly to the mobile device of the caregiver further comprises steps:
      generating multiple alerts on multiple channels such as Short Message Service (SMS) alert, mobile app notification;
      capturing a feedback on the generated alerts from the caregiver; and
      retraining the Convolutional Neural Network (CNN) based on the captured feedback to reduce false negatives and permit false positives, wherein, classifying regions of interest within the images involves usage of different layers of convolutional neural network, wherein classification comprises steps of:
      converting the received images into grey scale images and subtracting the background objects;
      recognizing the visual differences in the facial features of the baby based on plurality of sleeping positions and attributing them if the baby is trying to turn, or fully turned.

2. The system as claimed in claim 1, wherein the machine learning methods include a Deep Learning Model, wherein a Convolutional Neural Network (CNN) is trained on multiple baby images to adaptively refine the Deep Leaning Model.

3. The system as claimed in claim 1, wherein plurality of sleeping positions of the baby are categorized as sleeping on its back, starting to turn, or turned to sleep on front.

4. The system as claimed in claim 1, wherein the system leverages multiple channels of communication to ensure that latency in any channel do not fail the system, wherein in situations such of internet failure, the system is configured to work under home local area network such as a WiFi router for communicating notifications on the mobile device of the caregiver via an application.

5. A method to monitor a baby sleeping position using a child monitor camera positioned on a crib, the method comprising:
- receiving, by a processor, a plurality of images of the baby from the child monitor camera;
- storing, by a processor, the received plurality of images;
- processing, by a processor, the stored plurality image using machine learning methods that classify regions of interest within the images, recognize objects, and sleeping positions of the baby from the images;
- analyzing, by a processor, the plurality of images;
- detecting, by a processor, a plurality of sleeping positions the baby is in based on the analysis of the plurality of images; and
- electronically communicating, by a processor, wirelessly to a mobile device of a caregiver, information regarding the plurality of sleeping positions the baby is in based on the analysis of the plurality of images, wherein electronically communicating, by a processor, wirelessly to the mobile device of the caregiver further comprises steps: generating, by a processor, multiple alerts on multiple channels such as Short Message Service (SMS) alert, mobile app notification;
- capturing, by a processor, a feedback on the generated alerts from the caregiver; and
- retraining, by a processor, the Convolutional Neural Network (CNN) based on the captured feedback to reduce false negatives and permit false positives, wherein classifying regions of interest within the images involves usage of different layers of convolutional neural network, wherein classification comprises steps of:
- converting the received images into grey scale images and subtracting the background objects;
- recognizing the visual differences in the facial features of the baby based on plurality of sleeping positions and attributing them if the baby is trying to turn, or fully turned.

6. A non-transitory computer-readable storage medium, having computer executable instructions stored thereon that, when executed by the at least one processor, cause the at least one processor to:
- receive a plurality of images of the baby from the child monitor camera; store the received plurality of images;
- process the stored plurality image using machine learning methods that classify regions of interest within the images, recognize objects, and sleeping positions of the baby from the images;
- analyze the plurality of images;
- detect a plurality of sleeping positions the baby is in based on the analysis of the plurality of images; and
- electronically communicate wirelessly to a mobile device of a caregiver, information regarding the plurality of sleeping positions the baby is in based on the analysis of the plurality of images, wherein electronically communicating wirelessly to the mobile device of the caregiver further comprises steps to:
- generate multiple alerts on multiple channels such as Short Message Service (SMS) alert, mobile app notification;
- capture a feedback on the generated alerts from the caregiver; and retrain the Convolutional Neural Network (CNN) based on the captured feedback to reduce false negatives and permit false positives, wherein classifying regions of interest within the images involves usage of different layers of convolutional neural network, wherein classification comprises steps of:
- converting the received images into grey scale images and subtracting the background objects;
- recognizing the visual differences in the facial features of the baby based on plurality of sleeping positions and attributing them if the baby is trying to turn, or fully turned.

* * * * *